2,872,430

COMPOSITION COMPRISING A DIISOCYANATE MODIFIED POLYESTER AND POLYMERIZED VINYL CHLORIDE

John A. Parker, Lancaster Township, Lancaster County, and John Versnel, Manor Township, Lancaster County, Pa., assignors to Armstrong Cork Company, Lancaster, Pa., a corporation of Pennsylvania No Drawing. Application July 31, 1956
Serial No. 601,113

7 Claims. (Cl. 260—45.4)

This invention relates generally to surface covering materials and to binder systems for such surface covering materials. More particularly, it relates to surface covering materials and binder systems therefor wherein the binder system comprises an intimate blend of polymerized vinyl halide and diisocyanate-modified polyester.

In copending application Serial No. 536,736, filed September 26, 1955, there is described a surface covering composition comprising filler and a binder system of polymerized vinyl halide and diisocyanate-modified polyester. The diisocyanate-modified polyester described in that application is the reaction product of an organic diisocyanate and an unmodified polyester, which polyester is narrowly defined in terms of ingredients, ratios of ingredients, and acid number and hydroxyl number of the final unmodified polyester. The diisocyanate-modified polyesters disclosed in that application are all soft, gummy elastomers. Those elastomers are preeminently suitable to plasticize polymerized vinyl halide. The plasticized composition is then processible in the usual calendering equipment used for the production of linoleum.

However, linoleum can also be produced by what is called the molded process. In such a process, the linoleum composition is deposited in particulate form on a backing such as burlap, felt, and the like. The particulate linoleum composition may be deposited through stencils in sequential steps. Each step may deposit a portion of the composition in a color different from that deposited by the other steps. Thus the design and pattern effects obtainable are almost unlimited. When the particulate linoleum composition has been completely deposited on the backing, the composition is subjected to elevated temperatures and pressures in flatbed presses. After curing in air at elevated temperatures for the necessary period of time, the material is ready to be lacquered or waxed and prepared for shipment as molded linoleum.

It can be seen that the molded linoleum in contrast to calendered linoleum can tolerate a linoleum composition having an exceedingly high viscosity. Accordingly, the binder system and the finished linoleum composition to be used in the two different kinds of linoleum will be completely different. In view of the difference in processing the two kinds of linoleum, the processing characteristics of the compositions must differ. And despite this difference, both kinds of linoleum composition must still meet the rigid requirements of any composition to be used as a surface covering in regard to such characteristics as tensile strength, elongation, abrasion resistance, alkali resistance, and the like.

Accordingly, it is the primary object of the present invention to present a binder system and a linoleum composition suitable for the formation of molded surface coverings.

To this end, the invention contemplates a binder system for surface covering materials comprising an intimately blended mixture of about 90%–40% by weight diisocyanate-modified polyester and about 10%–60% by weight polymerized vinyl halide. The modified polyester is curable by an organic peroxide and not by the usual sulfur-containing curing systems. The modified polyester is the reaction product of just sufficient 2,4-toluene-diisocyanate with unmodified polyester to form an incipient gel. The unmodified polyester must have an acid number in the range of about 2–7 and a hydroxyl number in the range of about 20–55. The unmodified polyester is the reaction product of a saturated glycol consisting of a hydrocarbon group having 4 carbon atoms with two hydroxyl groups attached thereto, a saturated dibasic acid having 6–10 carbon atoms, and a dibasic acid having 4–5 carbon atoms and having a single ethylenically unsaturated bond. The mole ratio of the saturated acid and the unsaturated acid must be about 3:1.

The differences between the unmodified polyesters described herein and the unmodified polyesters described in the above-mentioned application Serial No. 536,736 are several. First, only a very narrow class of unsaturated dibasic acid and a single organic diisocyanate will yield the composition sought herein. Second, the acid number of the unmodified polyester herein must be even further restricted than the broader range disclosed in the aforesaid application. Third, the mole ratio of the saturated acid to the unsaturated acid is substantially greater herein than disclosed in the aforesaid application. These differences, while seemingly slight when taken separately, nevertheless combine to form two completely different products. The modified polyesters of the aforesaid application are soft, gummy elastomers, while the modified polyesters of the present application are tough, horny solids with a high degree of internal crystallinity. The polyesters of the aforesaid application are sulfur-curable and not organic peroxide-curable, while the modified polyesters described herein are peroxide-curable and not sulfur-curable. Floor covering binder systems of the aforesaid application are processible only on calender rolls and not in molded equipment, while the present compositions are processible only in molded equipment and not on calender rolls.

The polyester may be prepared in unmodified form only from three restricted classes of ingredients. The first ingredient must be a 4-carbon glycol having no hetero atoms in the hydrocarbon group. As a practical matter, only 1,3-butylene glycol, and 1,4-butylene glycol fall into this class, and the latter is preferred. The second ingredient must be a saturated dibasic acid having a carbon chain of 6–10 carbon atoms, as for example, adipic, sebacic, azaleic, methyl alipic acid, and the like. The third ingredient must be a dibasic acid having 4–5 carbon atoms and having a single ethylenically unsaturated bond in the molecule. Thus, these acids are limited to maleic, fumaric, itaconic, and citraconic acids and anhydrides thereof. It is to be noted that the nature of the double bond in itaconic acid is different from that in the other three acids in that it will possess a different degree of reactivity. However, under the conditions of polyester formation it is postulated that the itaconic acid isomerizes to citraconic acid; this may account for the operability of itaconic acid.

The ratio of the saturated dibasic acid to the unsaturated dibasic acid must be about 3:1 on a mole basis. This is critical and constitutes one of the main lines of demarcation between the polyesters described herein and the polyetsers described in application Serial No. 536,736. The reduction by a factor of about 25% of the number of unsaturated bonds in the polyester molecule changes the property of the resulting polyester out of all proportion to what normally would be expected when considered with the other modifications in the present polyesters.

Generally speaking, the total hydroxyl equivalent in the glycol will equal the total carboxylic acid equivalents in the two acids except for the fact that it is customary and sometimes essential to use an excess of glycol in the making of polyesters in order to drive the reaction to completion.

The preparation of the polyester may be carrid out along the lines of known polyester technics. Preferably the excess glycol may be caused to react with the unsaturated acid at a temperature of about 95° C. Since the unsaturated acid may sublime very readily at higher temperatures, the mixture of glycol and saturated acid may be heated until a half ester of the saturated acid is formed. The end of the formation of the half ester can readily be seen by the disappearance of the white solid unsaturated acid from the solution, causing the solution to become homogeneous. Once the half ester is formed, the unsaturated acid is more stable at elevated temperatures. Subsequent to the formation of the half ester of the unsaturated acid, the saturated dibasic acid may be added and the temperature of the mixture may be increased to about 145° C.

During the addition of the unsaturated and saturated acid, an inert gas flow should be maintained through the solution to minimize side reactions that occur in the presence of air. The unsaturated acids used herein are peculiarly sensitive to oxygen and, therefore, more than the usual amount of care must be taken to blanket the reactants and prevent traces of air from having access thereto. Dry carbon dioxide or dry nitrogen may be used as a protective blanket; similar inert gases may be used if desired.

Once the saturated acid has been added, the temperature may be raised to about 150° C. for a suitable period of time, for example, about 1 hour. The temperature is then slowly increased to 200° C. and maintained at that temperature until an acid number of about 30 is obtained. Subsequently the temperature may be raised to about 220° C., at a rate consistent with maintaining the glycol in the reactor so that esterification may continue. These higher temperatures are maintained until the end point is reached. In the latter stages of polymerization, where the acid number is below about 30 and the hydroxyl number is to be lowered further, the rate of decrease of the hydroxyl number may be dependent upon the rate of flow of inert gas and upon the temperature of the polymer. In order to obtain a rapid decrease of the hydroxyl number in the later stages of polymerization, the temperature of the polyester should be above the boiling point of the glycol used and the gas flow increased to such a rate that the volatile glycol is swept away from the reaction mixture. For the polyesters to be suitable for use in the present invention, it is necessary and critical to obtain an acid number in the final product in the range of about 2–7 and a hydroxyl number in the range of about 20–55. A preferred embodiment calls for an acid number in the range of about 5±2 and a hydroxyl number in the range of about 35±5. With these latter limits on acid numbers and hydroxyl numbers, the molecular weight will vary from about 3400 to about 2380.

The chain length of the molecules of the above-described polyesters should then be extended by means of 2,4-toluene diisocyanate. The use of this particular diisocyanate is critical. It has been found that aliphatic diisocyanates do not yield a product suitable for use in a binder system for surface coverings. Aromatic diisocyanates other than 2,4-toluene diisocyanate also yield modified polyesters with unsuitable properties. The proper amount of the diisocyanate should be intimately blended with the polester, preferably at room temperature, and the mixture then heated to a temperature in the range of about 100°–150° C. to accomplish incipient gelation.

The precise amount of diisocyanate to be added to a given amount of polyester will vary slightly according to the particular polyester involved, even where identical ingredients are used under purportedly identical conditions. For this reason, it is essential that each batch of polyester be tested to determine the exact amount of the diisocyanate needed for that particular batch of polyester if the polyester is to serve as a useful component in the binder system of the present invention. The addition of too little diisocyanate will yield a binder system and a surface covering material fabricated therefrom which is too soft, flexible, and which possesses too low abrasion resistance to serve as a useful surface covering material. On the other hand, an excess of diisocyanate yields a polyester with dangling free isocyanate groups. Such a polyester is water-reactive and may be sufficiently cross-linked to yield a tough, stiff, and unprocessible binder system completely unsuitable for surface covering materials.

The precise amount of diisocyanate to be added to the polyesters described herein should be that amount needed to give an incipient gel and no more. This amount may be determined by the following method. A number of samples of the polyester are withdrawn at the end of the polyester-forming process. To each of the samples after weighing is added a weighed amount of diisocyanate, the amount being different for each sample. The samples are then heated, for example, to a temperature in the range of about 100°–150° C. to accomplish incipient gelation and are then cooled. The sample containing the proper amount of diisocyanate will be that sample which just sets to a stiff gel. The point of incipient gelation defines the point where chain extension of the polyester is at a maximum and cross linking has just begun to occur. Generally speaking, the proper amount of diisocyanate will be that amount by weight equal to 0.6–0.9 isocyanate equivalent for each polyester equivalent. The ratio of isocyanate equivalent to polyester equivalent is defined herein by the letter R. Alternate methods of determining the proper amount of organic diisocyanate to be reacted with polyesters of the class described herein are more fully set forth in copending patent application Serial No. 536,737, filed September 26, 1955.

Once the proper amount of diisocyanate has been thoroughly and intimately dispersed throughout the polyester, the mixture is heated to an elevated temperature to achieve gelation as described above. Subsequently the diisocyanate-modified polyester may be cooled and utilized with a polymerized vinyl halide to form the binder system of the present invention.

The polymerized vinyl resins to be used in the binder system of the present invention may be those low-to-medium molecular weight polymerized vinyl halides available in commerce. Exemplary of such resins are those polyvinyl resins made by the Bakelite Company and bearing the designations "VYMF," "VYVF" (copolymer of vinyl chloride containing about 3%–5% vinyl acetate), "VYNW," "VYHH" (vinyl chloride copolymer containing about 13% vinyl acetate), and mixtures thereof. Additionally, the "Geon" resins sold by the B. F. Goodrich Chemical Company, in particular those polyvinyl chloride resins designated as "Geon 121" and "Geon 126," are suitable; straight polyvinyl chloride may be used where desired. The most significant property of the polymerized vinyl halide resin suitable for use in the binder system of the present invention is that of yielding a hard, tough, and otherwise suitable surface covering material after being plasticized with the peroxide-curable diisocyanate-modified polyesters described above. Thereafter the binder system may be admixed with suitable fillers and other ingredients to be described later and formed into a surface covering material.

To produce a surface covering having the desired properties, the binder system of the present invention contains about 10%–60% by weight polymerized vinyl halide and about 90%–40% by weight diisocyanate-modified polyester. It is to be noted that these ranges of amounts differ from those described in copending application Serial No. 536,736. These differing amounts are due to the differences in the nature of polyesters described herein from those described in that application. The present modified polyesters, while serving as a plasticizer for the polymerized vinyl halide, are also in the nature of a suitable binder by themselves; in this respect, too, they differ from those described in application Serial No. 536,736. For this reason, the present binder system may include up to 90% by weight of the modified polyester. On the other hand, the present binder system should not contain more than about 60% polymerized vinyl halide, since when more than about 60% of vinyl halide is present the binder system possesses too little flexibility; the elongation is too low.

Generally speaking, the binder system comprises about 85%–25% by weight of the surface covering composition and the filler comprises about 15%–75% by weight of the composition. Particularly advantageous results have been obtained when the filler includes a preponderant proportion by volume of fibrous filler such as wood flour, cork particles, asbestos, mineral fibers, and the like. The remainder of the filler—or the balance if so desired, is comprised of finely divided particles such as whiting, clay, silica, slate flour, and similar nonfibrous filler material. Also included in the filler component are small but effective amounts of lubricants and detackifying agents such as, for example, stearic acid, paraffin wax, ceresin wax, oleic acid, lauric acid, and dibutyl ammonium oleate.

The composition must also include an organic peroxide curing agent. The peroxide curing agent to be used herein must be able to withstand without decomposition a temperature of at least about 200° F. Thus not every organic peroxide compound will serve as a curing agent herein. Two suitable agents are ditertiary butyl perbenzoate and dicumyl peroxide, with the latter being preferred. The amount of peroxide curing agent to be used will generally be about 1–5 parts by weight per 100 parts by weight of diisocyanate-modified polyester. Preferably 1 to 2 parts by weight curing agent per 100 parts modified polyesters will be used.

The surface covering composition may also contain plasticizers such as tricresyl phosphate, dibutyl phthalate, m-alkyl toluene sulfonamide, and the like. Stabilizers or antioxidants such as hydroquinone, N-phenyl alpha naphthalamine, N-phenyl beta naphthalamine, N,N'-exomethylene-bis-ortho-hydroxy benzamide, sodium acid phosphate, dibutyl tin laurate, and others known in the art may be used. The total amount of the compounding agents exclusive of the fibrous and nonfibrous filler generally runs up to about 10% by weight of the filler.

As can be seen from the above, the compositions comprise a binder containing polymerized vinyl halide, preferably polyvinyl chloride, and a diisocyanate-modified polyester. It is also possible to utilize a composition which contains other ingredients besides the basic binder components. For example, vinyl chloride-vinyl acetate copolymers may be incorporated into the binder as well as synthetic rubber such as butadiene-styrene copolymers, butadiene-acrylonitrile copolymers, chloroprene polymers, and the like. Additionally, a portion of the binder may be replaced by additional and different polyesters.

In producing the composition to be used in a molded process, the filler, binder system, and additional ingredients may be mixed in an intensive mixer such as a Banbury. Alternatively, the ingredients may be blended on a cold mill. Subsequent to the blending operation, the composition may be divided into the particle size needed to pass through the stencil openings in a molded operation. Alternatively, the cold sheets formed on a cold mill may themselves be pressed in a flatbed press; this latter operation is only useful where design, color, and pattern of the finished goods are not important.

Following the production of the surface covering material on a backing as described earlier, the material must then be cured at elevated temperatures. Although the cure may be accomplished in curing presses, particularly advantageous results have been obtained by suspending the material in air and heating the suspended material at elevated temperatures. In order to obtain maximum physical properties, it is advantageous to utilize comparatively high temperatures such as temperatures in the range of about 210° F. to about 275° F., with optimum cure taking place at temperatures in the range of about 220°–250° F. The period of time for cure will generally run 8–30 hours until the surface covering composition develops the desired physical properties. After cooling, the final product may be given a high gloss by the application of lacquer and/or wax.

Although such surface covering materials are particularly well suited for use as floor coverings, the materials may also be employed as a covering for walls, desk tops, counter tops, sink tops, table tops, and the like in the form of sheet goods or tile.

The following examples illustrate several embodiments of the invention. All parts are by weight unless otherwise stated.

EXAMPLE I

*1,4-butylene adipate maleate (3:1)*

A mixture of 1,710 parts (19 moles, 20% mole excess) of 1,4-butane-diol and 392 parts (4 moles) of maleic anhydride was heated to 95° C. over a period of 20 minutes in a 5-liter, 4-neck flask equipped with stirrer, reflux condenser, and thermometer. Dry carbon dioxide gas was bubbled through the solution at the rate of 0.4 liter per minute for the entire reaction. After the maleic anhydride had dissolved, 1,753 parts (12 moles) of adipic acid was added and the temperature of the mixture was maintained at 150° C. for 60 minutes and then increased to 200° C. over an interval of 100 minutes. The temperature was held at 200° C. until an acid number of 28 was obtained.

After an acid number of 28 was obtained, the temperature was increased to 220° over a period of 45 minutes and the reaction was maintained at this temperature for the remainder of the cycle. The reaction was terminated when an acid number of 5.2 and a hydroxyl number of 34.7 were obtained. The total reaction time was 1,395 minutes. On cooling, the polyester was a stiff amber-colored liquid.

EXAMPLE II

*Diisocyanate-modified polyester*

1,000 parts of the polyester 1,4-butylene adipate maleate (3:1) prepared as in Example I and having an acid number of 3.9 and a hydroxyl number of 47.1 was placed in a container. It was determined that the polyester would gel at a ratio (R) of diisocyanate equivalents to polyester equivalents equal to 0.8. The polyester was heated to 90° C. and about 1.5 parts N-methyl morpholine was added as a catalyst to speed the reaction. The temperature was then raised to 110° C. and 63.1 parts of 2,4-toluene diisocyanate was added with stirring. The mixture was then heated to 125° C. and stirred for 15 minutes, at which point the viscosity increased so that stirring became difficult. The product was poured out into trays and permitted to cool.

EXAMPLE III

*Surface covering composition*

The following formulation was blended on a cold mill.

| Components: | Parts |
|---|---|
| Modified polyester of Example II | 74.9 |
| Polyvinyl chloride | 50.0 |
| Clay | 62.2 |
| Precipitated calcium carbonate | 20.6 |
| Whiting | 100 |
| Titanium dioxide | 30.1 |
| Tricresyl phosphate | 6.2 |
| Wax | 2.0 |
| Dicumyl peroxide | 1 |

The modified polyester and the polyvinyl chloride were first intimately blended on the mill, whereupon the other ingredients were added as fast as they could be taken up in the mixture. The result was a surface covering composition containing 36.05% binder and 52.98% fillers.

Cold sheets were taken off the mill and were cut up for samples. A press was heated to 320° F. and the samples were placed in the press and preheated without pressure for one minute. After preheating, the platen pressure was increased and the samples kept under these conditions for 7 minutes. After the total of 8 minutes at 320° F. and 7 minutes at a pressure of 500 pounds per square inch, the samples were cooled and removed from the press. Samples were prepared both with and without the dicumyl peroxide. The physical properties of these samples were as follows:

|  | 10% Modulus | Tensile Strength, Lbs./Sq. In. | Percent Elongation |
|---|---|---|---|
| Sample with dicumyl peroxide | 1,271 | 1,771 | 22 |
| Sample without dicumyl peroxide | 398 | 995 | 67 |

EXAMPLE IV

A series of polyesters was made as in Example I, modified as in Example II, and compounded as a binder system and surface covering composition as in Example III.

| Polyester Used | Percent Binder | Gel Point, R | 10% Modulus | Tensile Strength |
|---|---|---|---|---|
| 1,4 butylene adipate maleate (3:1) | 31 | .7 | 922 | 642 |
|  | 36 | ----- | 567 | 1,026 |
| 1,4 butylene adipate fumarate (3:1) | 31 | .7 | 1,090 | 2,200 |
|  | 36 | ----- | 817 | 1,345 |
| 1,4 butylene adipate fumarate (2:1) | 31 | .6 | ----- | 1,260 |
|  | 36 | ----- | 1,955 | 2,280 |

Residual indentation of each of the above samples was less than 0.006". The last polyester in the above listing, the 1,4 butylene adipate fumarate (2:1), was too hard and stiff and possessed insufficient flexibility and elongation for use as a surface covering material.

We claim:

1. A binder system for surface covering materials comprising an intimately blended mixture of about 90%–40% by weight diisocyanate-modified polyester and about 10%–60% by weight polymerized vinyl chloride, said modified polyester being cured after being blended with said polymerized vinyl chloride by an organic peroxide able to withstand without decomposition a temperature of at least 200° F., said modified polyester being the reaction product of 0.6–0.9 equivalents 2,4-toluene diisocyanate per equivalent unmodified polyester to form an incipient gel, said unmodified polyester having an acid number in the range of about 2–7 and a hydroxyl number in the range of about 20–55 and being formed from a saturated glycol consisting of a hydrocarbon group having 4 carbon atoms with two hydroxyl groups attached thereto, a saturated dibasic carboxylic acid having 6–10 carbon atoms, and a dibasic carboxylic compound selected from the group consisting of acids and anhydrides thereof, said compound having 4–5 carbon atoms and having a single ethylenically unsaturated bond, said saturated acid and said unsaturated compound being present in a mole ratio of about 3:1.

2. A binder system according to claim 1 wherein said saturated acid comprises adipic acid and said unsaturated compound comprises maleic anhydride.

3. A binder system according to claim 1 wherein said polymerized vinyl chloride comprises polyvinyl chloride.

4. A cured surface covering material comprising about 85%–25% by weight binder system and about 15%–75% by weight filler, the binder system comprising an intimately blended mixture of about 90%–40% by weight diisocyanate-modified polyester and about 10%–60% by weight polymerized vinyl chloride, said modified polyester being cured after being blended with said polymerized vinyl chloride by an organic peroxide and able to withstand without decomposition a temperature of at least 200° F., said modified polyester being the reaction product of 0.6–0.9 equivalents 2,4-toluene diisocyanate per equivalent unmodified polyester to form an incipient gel, said unmodified polyester having an acid number in the range of about 2–7 and a hydroxyl number in the range of about 20–55 and being formed from a saturated glycol consisting of a hydrocarbon group having 4 carbon atoms with 2 hydroxyl groups attached thereto, a saturated dibasic carboxylic acid having 6–10 carbon atoms, and a dibasic carboxylic compound selected from the group consisting of acids and anhydrides thereof, said compound having 4–5 carbon atoms and having a single ethylenically unsaturated bond, said saturated acid and said unsaturated compound being present in a mole ratio of about 3:1.

5. A cured surface covering material according to claim 4 wherein said polymerized vinyl chloride comprises polyvinyl chloride.

6. A cured surface covering material according to claim 4 wherein said glycol comprises 1,4-butylene glycol, said saturated acid comprises adipic acid, and said unsaturated compound comprises maleic anhydride.

7. A surface covering material according to claim 4 wherein said acid number is about 4 and said hydroxyl number is about 47.

References Cited in the file of this patent

UNITED STATES PATENTS

| 2,255,313 | Ellis | Sept. 9, 1941 |
| 2,606,162 | Coffey et al. | Aug. 5, 1952 |
| 2,625,531 | Seeger | Jan. 13, 1953 |
| 2,698,838 | Simon et al. | Jan. 4, 1955 |

UNITED STATES PATENT OFFICE
CERTIFICATE OF CORRECTION

Patent No. 2,872,430                                   February 3, 1959

John A. Parker et al.

It is hereby certified that error appears in the printed specification of the above numbered patent requiring correction and that the said Letters Patent should read as corrected below.

Column 2, line 46, for "alipic" read -- adipic --; column 3, line 3, for "carrid" read -- carried --; column 8, line 24, after "peroxide" strike out "and".

Signed and sealed this 12th day of May 1959.

(SEAL)
Attest:

KARL H. AXLINE
Attesting Officer

ROBERT C. WATSON
Commissioner of Patents